United States Patent [19]

Pisecky et al.

[11] Patent Number: 4,490,403
[45] Date of Patent: Dec. 25, 1984

[54] PROCESS FOR PRODUCING AN AGGLOMERATED POWDERY MILK PRODUCT

[75] Inventors: Jan Pisecky, Tåstrup; Jens Krag, Copenhagen; Ib H. Sorensen, Frederikssund, all of Denmark

[73] Assignee: A/S Niro Atomizer, Soborg, Denmark

[21] Appl. No.: 503,983

[22] Filed: Jun. 13, 1983

[30] Foreign Application Priority Data

Jun. 14, 1982 [DK] Denmark .............................. 2670/82

[51] Int. Cl.³ ........................... A23C 9/16; B01D 1/16
[52] U.S. Cl. .................................. 426/453; 159/4 CC; 159/48.1; 159/DIG. 3; 426/467; 426/471
[58] Field of Search ............... 426/453, 467, 471, 588, 426/285; 159/4 CC, 48.1, DIG. 3; 34/57 R, 10

[56] References Cited

U.S. PATENT DOCUMENTS 3,554,760  1/1971  Sienkiewicz et al. ................ 426/453
3,615,723 10/1971  Meade .................................. 426/453
3,731,393  5/1973  Okada et al. ....................... 34/57 R

FOREIGN PATENT DOCUMENTS 1461038  1/1977  United Kingdom .

OTHER PUBLICATIONS

"Niro atomizer", Voedingsmiddelen Technologie, vol. 15, No. 15, Jul. 1982, p. 37, Zeist, NL.

*Primary Examiner*—George Yeung
*Attorney, Agent, or Firm*—Beveridge, DeGrandi & Kline

[57] ABSTRACT

An agglomerated powdery milk product is prepared by spraying a concentrate of milk or a fraction thereof into a stream of drying gas directed against the surface of a fluidized layer of already spray dried particles in a conical chamber, thereby obtaining a favorable interaction. Special parameters including temperatures, rates of streams of drying air and residence time are adjusted to obtain an extensively agglomerated product, high production capacity, improved heat economy, low heat damage of the product, and to make possible an easy spray drying of materials, which have hitherto been regarded as unsuitable for spray drying.

15 Claims, 1 Drawing Figure

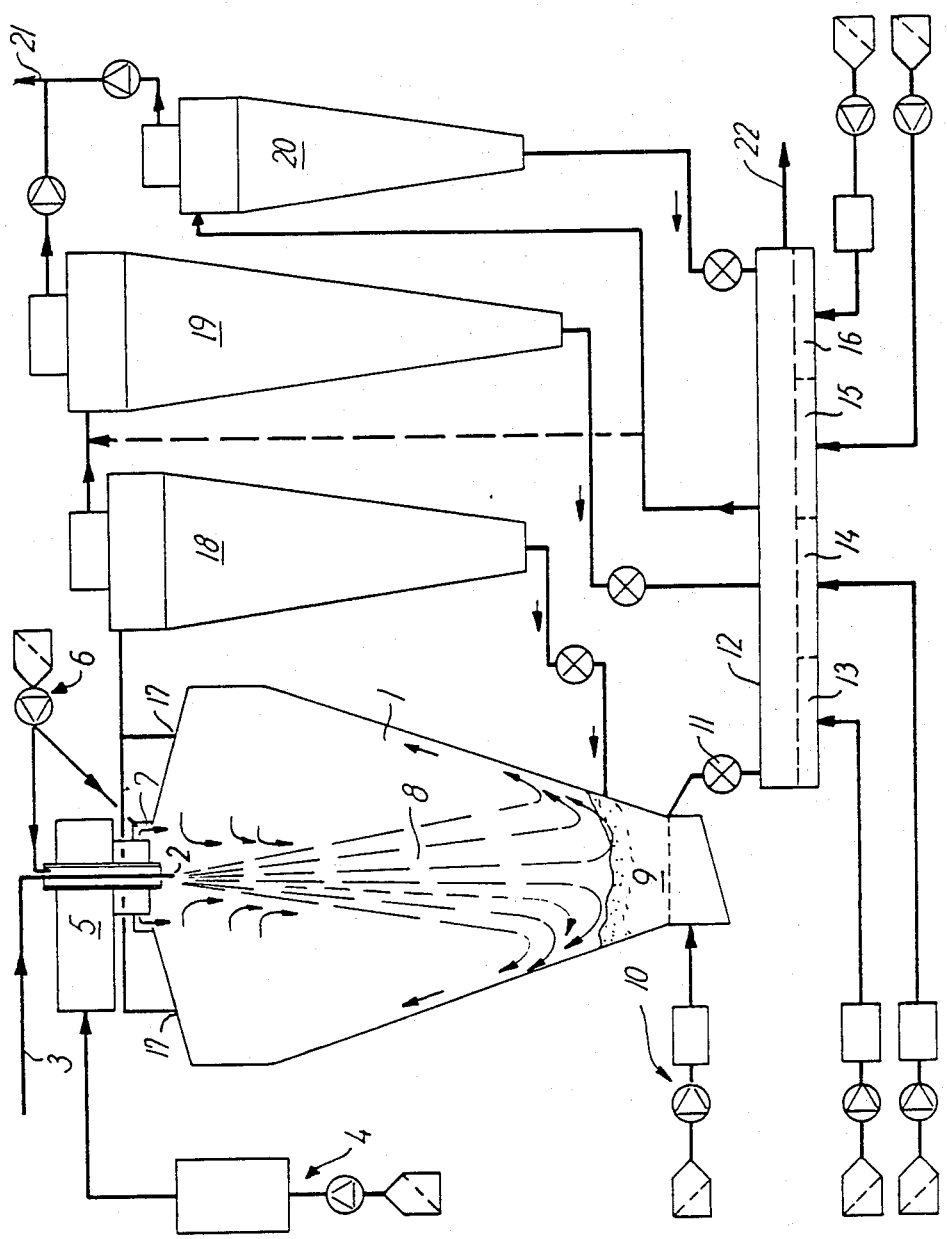

PROCESS FOR PRODUCING AN AGGLOMERATED POWDERY MILK PRODUCT

FIELD OF THE INVENTION

The present invention relates to a process for producing an agglomerated powdery milk product. Examples of products suitable for being prepared by the process include the following: skim milk powder, whole milk powder, whey powder possibly prepared from precrystallized whey, possibly comprising added fat and other additives suitable for food and fodder products, and powders produced by drying of other liquids derived from milk such as permeates obtained by membrane filtration and similar products.

The process is especially suitable for spray drying milk derived liquids which due to heat sensitivy or formation of sticky products may be difficult to spray dry when a high quality product is required. Besides the process enables savings both as regards operational costs and capital investments.

BACKGROUND OF THE INVENTION AND PRIOR ART

It is well known that drying of milk concentrates and similar liquids may be performed in two steps, viz a first step, in which the liquid is atomized in a stream of hot air in a drying chamber to produce moist particles which in a second step are further dried to the desired moisture content in a fluidized bed, cf. U.S. Pat. No. 3,956,521. Said splitting up of the drying process in two steps involves certain advantages as to heat economy and product quality over conventional one step spray drying processes in which no drying in fluidized bed is used.

From French patent specification No. 1,526,478 and from published German patent application No. 2,125,155 it is known to arrange a fluidized bed in the bottom part of the drying chamber of a spray drying or spray cooling unit. Said use of spray drying or cooling over a layer of fluidized particles produced by the spray drying or cooling is described as suitable for producing relatively large granules of the desired products, which primarily are fertilizers.

When producing fertilizers it is preferred to achieve monogranular granules, which term in the present specification and in the attached claims means granules having a very compact structure with little interstitial air due to the fact that they have an onion skin-like structure or consist of particles which are substantially completely fused or coalesced. Such granules have high mechanical strength and dissolve relatively slowly in water, which may be an advantage as far as fertilizers are concerned. Said compact structure is obtained partly as a result of the fact that the droplets to be dried contain a relatively high proportion of dissolved salts.

However, when milk products of the above defined type are concerned, it is desired to obtain the product as agglomerates and not as monogranular granules. The term agglomerates in this context are used as covering clusters of particles which adhere together at certain points of contact, which clusters have a non-compact, porous structure including a substantial amount of interstitial air. When such agglomerated clusters of milk products are introduced in water, they disintegrate and the individual particles forming the clusters are easily dispersed.

It is to be observed that combinations of spray drying and drying or cooling in fluidized bed or fluidized, bed-like systems arranged in one unit have been suggested not only in connection with the production fertilizers.

Thus, French patent specification No. 1,423,070 discloses a spray drier having a fluidized bed in the bottom part. In said specification it is not indicated which type of products is to be produced. However, since the apparatus disclosed in said French specification is designed to exclude substantial contact between the fluidized layer and the particles in the spray drying zone, it is unsuitable for obtaining the purpose of the present invention, as it will appear from the below explanation.

Published German patent application No. 2,122,237 discloses a method for drying of food products or chemical or pharmaceutical products among which are mentioned milk products such as yogurt and quark. By said method a spray drying is combined with a drying in fluidized bed. It is not defined whether these two treatments are carried out in two different apparatuses or in one apparatus. The method comprises a first step, in which the particles to be dried move counter-current to the drying air, and a second step wherein the particles receive a final drying in a fluidized bed, whereby agglomerates are created. To reduce heat damage, relatively low temperatures are used for the drying air, which necessitates a previous dehumidification thereof. Use of a counter-current principle in the first drying step involves that the method results in a rather extensive heat damage of the product relative to the damage involved in co-current processes. For this reason it is not possible to use as high an inlet temperature of the drying air in first step as it would be desired for obtaining low heat consumption. Moreover, the application of the counter-current principle only permits an extremely limited velocity for the drying air in the first drying step, which in turn involves that the apparatus required for obtaining a certain drying capacity necessarily has to be rather voluminous and consequently the investments become high. Besides it is often desired to achieve a more extensive agglomeration than the one which is obtained in a conventional fluidized bed as the one which is used in said published application.

In the paper J. Due Jensen: "Agglomerating, Instantizing, and Spray Drying" (Food Technology, vol. 29, no. 6, June 1975, pages 60-71) a drying operation is disclosed, in which the liquid to be dried is atomized over or into a fluidized bed, and it is stated that in this way particle growth can occur either as agglomeration of several particles, or as layering of solid onto individual particles to obtain the so called onionskinning effect.

However, said method is of another type than the process according to the present invention, because the total drying takes place in the very fluidized layer, which involves drawbacks because of risk of heat damage. Moreover the drying capacity is rather limited.

French patent specification no. 2,095,614 discloses spray drying of milk in a spray drying tower in which a layer, described as a fluidized layer, is maintained in the bottom part. However, it appears that said layer is not a proper fluidized layer (viz a layer of particles acting as a liquid) and it is indicated as having a thickness of only 2-3 mm, which would in no way make possible the achievements of the objects of the present invention, because the layer only acts as a powder slide conveyer.

Also U.S. Pat. No. 3,735,792 discloses a spray drying chamber having means for maintaining a fluidized layer at the bottom part thereof. According to said specification a very specific swirling flow of particles from the fluidized layer to the top section of the drying chamber and back to the fluidized layer is mandatory to achieve the desired results. With that design the atomized droplets of liquid to be dried are contacted with already dried particles, while the droplets are still in liquid state, for which reason the particles produced to a substantial extent will obtain a monogranular structure and not be agglomerated clusters as defined above.

SUMMARY OF THE INVENTION

We have now found that agglomerated powdery milk products, as defined above, may advantageously be prepared by a process comprising the steps of:
(a) atomizing a liquid derived from milk, in the upper part of a conical downward tapering drying chamber by means of a nozzle into a central downward stream of drying gas at 200°–400° C. to produce particles,
(b) maintaining in the lower part of said drying chamber a layer of particles fluidized in an upward stream of gas having a velocity of 0.3–1.5 m/sec, preferably 0.6–1.5 m/sec, whereby the temperature of said gas is adjusted between 10° and 150° C. to maintain the temperature required of the fluidized particles for ensuring the agglomeration ability of said particles with respect to the particles produced in step (a) and the amount of particles in the fluidized layer is adjusted corresponding to a pressure drop of 1.5–4.5 kPas over the fluidized layer,
(c) adjusting the amount of said liquid to the amount and drying capacity of the downward stream to ensure a moisture content of the particles when reaching the fluidized layer between 2–16% and sufficient for agglomerating and particles by forming clusters thereof, but less than the moisture content which could cause formation of monogranular granules, and also to ensure that the downward gas stream have still a substantial drying capacity when reaching the fluidized layer and sufficient kinetic energy for penetrating therein, thereby contributing to the drying process in the fluidized layer and promoting removal of particles and small agglomerates from the fluidized layer to the upper part of the drying chamber for agglomerate forming contact with wet droplets and moist particles,
(d) withdrawing a stream comprising the gas from said downward stream and the gas from said upward stream at a non-central location in the upper part of the drying chamber,
(e) adjusting the amount of drying gas introduced as a central downward stream to be 2–4 times the amount of the upward stream of fluidizing gas, and
(f) recovering agglomerated particles from said fluidized layer.

This method makes possible the spray drying of liquids which have hitherto been regarded as unsuitable for spray drying, such as whey with added fat, and it makes possible an even more lenient drying than the above mentioned two steps method, which means that products having very low heat damage may be obtained even when the drying gas in which the atomization takes place in step (a) is very hot. A high temperature for the drying gas is desired since it involves an improved heat economy as explained in the above cited U.S. Pat. No. 3,956,521.

The process enables the achievement of a substantially improved heat economy for high quality products relative to what can be achieved by a method as the one dealt with in the above-mentioned German published patent specification No. 2,122,237.

When producing whole milk powder or skim milk powder the process may easily be operated to deliver a particle size distribution essentially between 200 and 750$\mu$, which results in a good dispersibility in water and a good flowability.

A highly improved agglomeration is obtained by the process according to the invention since extremely turbulent conditions exist in the fluidized bed, especially in the upper part thereof, where collision takes place with the downwards directed particle-containing gas stream. In this area of collision a high probability exists for the desired collision between the particles while these have a humidity optimal for agglomerate formation.

Another important advantage inherent in the process is the fact that an apparatus for performing the process may be substantially smaller than a conventional spray drier of the same production capacity, because a relatively short residence time for the drying gas in the chamber is required.

The apparatus required for performing the present invention may be constructed substantially more compact than conventional spray dryers and also more compact than the apparatus required for performing the method disclosed in the above German published patent specification No. 2,122,237. According to said published application, a counter-current drying is used in the first step, as explained above. Obviously said feature limits the velocity of the drying air and consequently the proportion of drying air, which can be utilized in a certain apparatus per hour. A corresponding limit does not exist in connection with the method according to the invention, because the character of the air flow permits a higher proportion of drying air per hour without unacceptable entrainment of particles in the leaving gas. A reason why application of a high velocity for the downward air stream is possible without unacceptable entrainment of particles in the leaving gas is i.a. that a part of the said particles in said downward air stream leaves the air stream and is taken up in the fluidized layer when the air stream turns off near the upper limit of the fluidized layer, because the particles at said location will be influenced by the centrifugal force, and because excessive agglomeration takes place in the fluidized layer.

The process is carried out by use of an apparatus comprising
(a) a drying chamber having substantial conical, downward tapering walls forming an angle to the vertical of 15°–30°, preferably 18°–24°,
(b) a downward directed nozzle mounted centrally in the upper part of the chamber,
(c) a downward directed gas disperser having an annular opening to the chamber coaxially encircling said nozzle,
(d) a perforated horizontal plate in the bottom of the chamber for supporting a fluidized particle layer, the distance from said perforated plate to said disperser being 10–15 times the maximum diameter of the annular opening,
(e) means for providing hot drying gas to said gas disperser, (f) means for providing gas to a location below said perforated plate, (g) means for withdrawing a stream comprising the gas from said downward stream and the gas from said upward stream at a non-central location in the upper part of the drying chamber, and (h) means for recovering agglomerated particles from a site just above the perforated plate.

Since the agglomeration of a certain product is highly dependent on the moisture content and the temperature, it is possible to regulate the degree of agglomeration by increasing or decreasing the amount of water evaporated in the fluidized bed at the bottom of the drying chamber. This is done by variation of the inlet temperature of the air fed to the fluidized bed and by varying the temperature of the mixed stream of gases withdrawn from the drying chamber.

As the velocity of the primary central downward stream of drying gas is typically 20–30 m/s and as the combined gases are withdrawn from the top of the drying chamber, the suction of the downward jet-like gas stream tends to attract air and fine particles and the partly dry particles in the gas stream will agglomerate with the particles in the upward moving gas stream. Because of the conical shape of the drying chamber, the upward velocity will be lower in the top of the chamber, for which reason only the smallest particles will be entrained to the top where some of these will agglomerate with the very wet particles in the downward gas stream. On the other hand agglomerates that are somewhat bigger will only be carried partly to the top of the drying chamber and thus they will collide with the particles in the downward gas stream at a point where these are more dry and the resulting agglomeration will be of such a nature that the agglomerates are easily dispersible.

By insuring that the ratio of the distance from the perforated plate to the air disperser is within the above indicated limits (10–15 times the maximum diameter of the annular opening), it is possible to obtain the desired impact of the downward particle-containing gas stream into the fluidized layer.

The height of the fluidized layer in the bottom of the drying chamber is 0.5–1½ to insure the desired heat transfer and interaction.

In the prior art milk dryers in which spray drying and fluid bed drying is arranged for in a single apparatus said two drying stages are operating completely independent of each other, i.e. in the same way as if they were performed in physically separated units. However, in the process according to the present invention there is a high degree of interaction between the two drying stages. This interaction takes place because the downward stream of drying gas and particles at the moment when it is reaching the fluid bed still has a substantial part of its drying potential and velocity and therefore penetrates into the fluidized bed and participates together with the gas introduced below the perforated plate in the drying step in the fluidized layer. At the same time the gas which from above penetrates into the fluidized layer increases the upward velocity of the mixed gases leaving said layer. This involves a desired increase of the amount of particles entrained to the upper part of the drying chamber, whereby a promoted agglomeration is obtained, as exaplained above.

As mentioned it is important that a certain interaction takes place between the downward stream of particles containing drying gas and the fluidized particle layer. To obtain said desired interaction the ratio between the kinetic energy of the downward stream of gas and the kinetic energy of the upward stream of gas in the fluidized layer is in the range of 1000–15,000.

It is to be observed that the effect obtained by the process goes far beyond the additive effect of the treatments taking place in a spray drying zone and in a fluidized layer. Only by creating an extensive interaction between the downward particle containing gas stream and the fluidized layer by arranging for a vigorous impingement therebetween, it is possible to obtain the extremely high capacity of a small apparatus and to achieve the desired highly agglomerated non-compact product.

To secure the desired treatment of the particles in the fluidized layer as to agglomeration and possibly drying thereof and to maintain a stable fluidized layer, which is not partially displaced by the impact of the downward stream of drying gas, the fluidized layer should be relatively high and preferably the height thereof is at least half of the width thereof, and it should be sufficient for securing a mean residence time of the particles therein of at least 5 minutes. In industrial scale apparatuses the height of the fluidized layer will typically be ½–1½ m.

In a preferred embodiment the agglomerated particles recovered from the fluidized layer in step (f) are further dried and/or cooled outside the drying chamber, preferably in a vibrated fluidized bed.

The stream of gas which is withdrawn from the drying chamber at a non-central location in the upper part of the drying chamber comprises the drying gas into which the liquid has been atomized and the gas having been used for maintaining the fluidized layer as well as auxiliary air, if any, and water vapour. Said stream entrains fine particles of powder produced in the spray drying process. Said entrained particles are collected in a suitable collector means, e.g. a cyclone, and since they are usually not agglomerated to the extent desired, they are preferably recycled to the fluidized layer in the bottom of the drying chamber.

The various parameters of the process, such as the temperatures of the downward stream of drying gas in step (a) and the temperature of the upward stream of gas in step (b) as well as the moisture content of the particles when reaching the fluidized layer, all depend on the specific product to be produced.

Thus for producing an agglomerated skim milk powder the following steps are preferred:

(a) atomizing a skim milk concentrate of 45–52% of weight dry solids into a stream of air at 230–350 C. having a downward velocity of 20–40 m/sec, whereby the amount of said concentrate is adjusted to produce particles of skim milk powder, which, when reaching the surface of said fluidized layer, have a moisture content of 10–15%.

(b) maintaining said layer of fluidized particles at the temperature of 60°–80° C. by introducing drying air at 70°–150° C. having an upward velocity of 0.3–1.5 m/sec in the lower part of said layer, (c) withdrawing from the upper part of the drying chamber a stream of air entraining fine particles of skim milk powder, (d) collecting said fine entrained particles, (e) recycling the collected fine particles to said fluidized layer in the drying chamber, (f) recovering agglomerated skim milk powder particles having a moisture content of 3.0–9% from the fluidized layer.

When the skim milk powder recovered from the fluidized layer has a moisture content above 5% it will usually be subject to a further drying outside the drying chamber, preferably in a vibrated fluidized bed, to a moisture content of 2–5%, but also when the skim milk powder is recovered having a lower moisture content it is preferred to perform a supplementary treatment in a vibrated fluidized bed to dry and/or cool the powder.

In case agglomerated whole milk powder is to be produced, the procedure is perferably as follows:

(a) atomizing a whole milk concentrate of 45–52% by weight dry solids into a stream of air at 200°–300° C. having a downward velocity of 20–40 m/sec, whereby the amount of said concentrate is adjusted to produce particles of whole milk powder which, when reaching the surface of said fluidized layer have a moisture content of 8–16%, (b) maintaining said layer of fluidized particles at the temperature of 60°–80° C. by introducing drying air at 70°–150° C. having an upward velocity of 0.3–1.5 m/sec in the lower part of said layer, (c) withdrawing from the upper part of the drying chamber a stream of air entraining fine particles of whole milk powder, (d) collecting said fine entraind particles, (e) recycling the collected fine particles to said fluidized layer in the drying chamber, (f) recovering agglomerated whole milk powder particles having a moisture content of 4.5–9% from the fluidized layer.

The range of temperature for the air stream in step (a) applies in connection with the use of a drying chamber of substantial conical shape and nozzle atomization. In the described alternative embodiment where a rotary atomizer is used said temperature range will perferably be 150°–230° C.

The whole milk powder recovered from the fluidized layer is preferably further dried and cooled outside the drying chamber to a moisture content of 2–4%. Also in this case the supplementary drying and cooling may suitably be performed in a vibrated fluidized bed.

As already stated the process makes possible a spray drying of products which has hitherto been regarded as unsuitable for spray drying, such as whey with added fat. It has turned out that agglomerated whey powder may be produced by means of the following steps:

(a) by means of a nozzle atomizing a preferably pre-crystallized whey concentrate of 48–58% by weight dry solids into a stream of air at 230°–350° C. having a downward velocity of 20–40 m/sec, whereby the amount of said concentrate is adjusted to produce particles of whey powder which, when reaching the surface of said fluidized layer, have a moisture content of 2–6%, (b) maintaining said layer of fluidized particles at the temperature of 70°–90° C. by introducing drying air at 10°–80° C. having an upward velocity of 0.3–1.5 m/sec in the lower part of said layer, (c) withdrawing from the upper part of the drying chamber a stream of air entraining fine particles of whey powder, (d) collecting said fine entrained particles, (e) recycling the collected fine particles to said fluidized layer in the drying chamber, (f) recovering agglomerated whey powder particles from the fluidized layer, which particles have an average particle size of 200–700μ and a moisture content of 1–5%.

Also the whey powder particles are preferably further dried and/or cooled in a vibrated fluidized bed outside the drying chamber.

DESCRIPTION OF THE DRAWING

The invention is further described with reference to the accompanying drawing which is a schematic representation of a plant suitable for performing the process of the invention.

DESCRIPTION OF PREFERRED EMBODIMENTS

On the drawing 1 represents a drying chamber having a substantially conical downward tapering shape. Said drying chamber is provided with a nozzle 2 for spraying a feed consisting of a concentrate of milk or milk fraction provided through conduit 3.

An air supply system 4 delivers hot air (in the following terminal primary drying air) to an air disperser 5 from which the hot drying air is introduced via an annular opening into the drying chamber as a downward stream of relatively high velocity.

An air supply 6 is provided for delivering auxiliary gas at ambient temperature to a circular slot 7 to cool the edge of the hot air inlet and further delivers gas for a cooling jacket around that part of the feed conduit 3, which passes through the air dispenser 5. Said cooling gas also serves as coolant for the nozzle 2.

Droplets of the feed liquid atomized through the nozzle 2 into the high velocity downward air stream (on the drawing indicated as 8) evaporate quickly whereby the atomized droplets are converted into wet particles within a very short period before reaching a fluidized layer 9 maintained in the bottom part of the drying chamber 1. Said fluidized layer is supported by a perforated plate through which an upward stream of air (in the following termed secondary air) is provided to maintain layer 9 in fluidized state. The distance from said perforated plate to the annular opening of the air disperser is 10–15 times the diameter of said annular opening.

Said secondary air in an amount of ½–¼ of the amount of the primary drying air is provided by an air supply system 10.

As shown on the drawing the primary drying air containing moist particles hits the fluidized layer 9 and to some extent penetrates therein. Since the highest impact occurs at the central area of the fluidized layer a certain deformation takes place of the otherwise horizontal surface thereof. Primary drying air penetrates into the fluidized layer 9, mixes with the secondary air, and together with entrained particles and small agglomerates the resulting in air mixture flows upwards along the conical walls of the drying chamber. Since more space is available in the upper part of the chamber, the upward velocity decreases and consequently the particle entraining ability gradually decreases the longer the distance is from the fluidized layer 9. As agglomerates and particles are the less entrainable the larger their size is, a separation takes place which involves that the relative coarse agglomerates and particles are reintroduced in the particle-containing primary drying air at a location in the lower end of the drying chamber where they contact primary particles which have already been dried to a certain extent, whereas the relative fine particles are reintroduced in the primary drying air in the upper end of the chamber where they contact wet droplets and very moist particles and form agglomerates therewith. Consequently very favourable conditions exist for formation of an extensively agglomerated product of very even particle size distribution and formation of large, monogranular particles is avoided.

By means of a rotary valve 11 the height of the fluidized layer 9 and the mean residence time of the particles in said layer are adjusted dependent on the specific product treated and dependent on the desired characteristics as to particle size distribution, moisture content etc..

From the rotary valve 11 the agglomerated particles are, in the shown preferred embodiment, conducted to a vibrated fluid bed 12 (Vibro-Fluidizer (t.m.)).

The shown vibrated fluid bed apparatus has four sections, viz. 13, 14, 15 and 16 resp. The first of these sections are supplied with warm air to enable further drying while one or more of the last sections are used for cooling.

Vibrated fluidized bed apparatuses suitable to be used in connection with the present invention are well-known in the art.

A stream of gas consisting of the primary drying air, the secondary air and auxiliary air provided by 6 is withdrawn through outlets 17 in the upper part of the spraying chamber.

From said outlets the withdrawn stream, which entrains a substantial amount of fine particles, is conducted to a cyclone 18 in which the main portion of particles is separated and recycled to the fluidized layer 9. The exhaust air leaving the cyclone 18 is conducted to a further cyclone 19 in which further particles are separated to be discharged to the vibrated fluid bed 12.

The exhaust gas from the vibrated fluidized bed 12 is let to a further cyclone 20 and sent to a common exhaust 21 together with the chamber exhaust gas from cyclone 19. Particles separated in cyclone 20 are recycled to the vibrated fluidized bed 12.

The resulting agglomerated product leaves the vibrated fluidized bed through 22 and is ready for packing, preferably after a sieving operation (not shown).

Obviously numerous amendments are possible of the depicted plant e.g. the vibrated fluidized bed may serve solely for cooling purposes and the exhaust gas from the vibrated fluid bed may be let to the cyclone 19 whereby cyclone 20 may be dispensed with.

The process of the instant invention will be elucidated further by means of the following embodiment examples using various typical starting materials.

EXAMPLE I

This example was performed in a plant as the one illustrated on the drawing.

The spray drying chamber had a maximal diameter of 5 m and a total height of 6½ m. The diameter of the annular air disperser opening was 50 cm and the distance from there to the perforated plate was 5.8 m.

2728 kg skim milk concentrate of 48% total dry solids and a temperature of 60° C. was atomized per hour.

The primary drying air had a temperature of 320° C. and was introduced into the drying chamber at the velocity of 26 m/sec.

Cooling air was introduced as described in connection with FIG. 1.

The moisture content of the particles when reaching the fluidized layer was 14.8%. These primary particles became extensively agglomerated partly due to primary agglomeration (colliding each other), partly and especiallly due to secondary agglomeration (hitting already dried particles being blown up by the violet fluidization of the fluidized layer 9) and interaction as described above, and partly due to tertiary agglomeration (contacting fluidized agglomerates inside the fluidized layer 9).

The temperature of the air supplied by 10 to the fluid bed at the bottom of the drying chamber was 140° C. and the amount corresponded to a fluidizing velocity of 0.65 m/sec. at the bottom part of the fluidized layer 9. The pressure drop over the fluidized layer was 3.0 k Pas. The secondary drying taking place in this fluidized layer reduced the powder moisture to 5%.

1378 kg/h of this product left the fluidized layer through rotary valve 11 and was introduced into the vibrated fluidized bed apparatus 12. The various sections of this vibrated fluidized apparatus were supplied with air having the following temperatures: First section 13: 75° C.; second section 14: 95° C.; third section 15: 19° C. and fourth section 16: 11° C.

The temperature of the powder in the fluid bed in the drying chamber was kept at 70° C. and the temperature of the air withdrawn through 17 was also 70° C.

Fine particles entrained in various gas streams were separated and recycled as indicated on the drawing.

The final skim milk powder was recovered at 22 with a moisture content of 3.85%.

The agglomerated skim milk powder obtained had the following characteristics:

| Bulk density: | |
| --- | --- |
| Tapped 0 x: | 0.37 g/ml |
| Tapped 100 x: | 0.42 g/ml |
| Tapped 1250 x: | 0.46 g/ml |
| Solubility Index | 0.3 (ADMI) |
| Wettability | >2 min. (NA Method No. A5a) |
| Dispersibility: | 100 (International IDF Standard 87:1979) |
| Particle Size Distribution: | 500–750 micron 24% |
| | 315–750 micron 18% |
| | 250–250 micron 17% |
| | 200–250 micron 11% |
| | 177–200 micron 6% |
| | 149–177 micron 8% |
| | 120–149 micron 5% |
| | <120 micron 11% |
| Particle Density: | 1.35 g/ml |
| Flowability: | 10 sec. (NA Method No. A 23a). |

EXAMPLE II

This example was performed as indicated in Example I except for the following:

The starting material was 2,283 kg/h whole milk concentrate of 48% total solids and of a temperature of 65° C.

The temperature of the primary drying air was 285° C. and the downward velocity thereof 31 m/sec.

The moisture content of the particles when reaching the fluidized layer 9 was 15.3%.

Secondary drying air was supplied by the system 10 at a temperature of 128° C. and the fluidizing velocity in the layer 9 was 0.75 m/sec. The pressure drop over the fluidized layer was 2.7 kPas. The moisture content of the powder leaving the fluidized layer in the spraying chamber was 4.1%.

Particles were recovered from the drying chamber in an amount of 1,130 kg/h and the temperatures in the vibrated fluidized bed were as follows: First section (13): 72° C.

Second section (14): 90° C.
Third section (15): 18° C.
Fourth section (16): 11° C.

The final whole milk powder was obtained with a moisture content of 2.25%. This powder had the following characteristics:

| Bulk Density: | |
| --- | --- |
| Tapped 0 x: | 0.35 g/ml |
| Tapped 100 x: | 0.41 g/ml |
| Tapped 1250 x: | 0.42 g/ml |
| Solubility Index: | 0.1 (ADMI) |
| Particle Size Distribution: | 700–750 micron 21% |
| | 315–750 micron 30% |
| | 250–315 micron 22% |
| | 200–250 micron 9% |
| | 177–200 micron 5% |
| | 149–177 micron 5% |
| | 120–149 micron 3% |
| | <120 micron 5% |
| Particle Density: | 1.21 g/ml |
| Flowability: | 17 sec. (NA Method No. A 23a) |
| Free Fat: | 2.3% calculated on powder (NA A10a). |

Subsequently this powder was treated with lecithin according to U.S. Pat. No. 3,773,519. The resulting whole milk powder with 0.21% lecithin added was cold water instant having a dispersibility (IDF) of 99%.

EXAMPLE II

This example was performed as described in connection with example I with the following amendments:

The starting material was 1,860 kg/h precrystallized whey concentrate of 55% total solids and having a temperature of 15° C.

The primary drying air was of 260° C. and was introduced into the drying chamber with a velocity of 25 m/sec.

The moisture content of the particles when reaching the fluidized layer 9 was 4%.

The temperature of the air supplied by the system 10 to the fluid bed in the bottom of the drying chamber was 24° C. and the fluidizing velocity 0.55 m/sec. The pressure drop over the fluidized layer was 3.2 kPas.

1065 kg/h of powder was withdrawn through the valve 11. The temperatures for the air supplied to the vibrated fluidized bed apparatus were as follows:
First section (13): 65° C.
Second section (14): 75° C.
Third section (15): 19° C.
Fourth Section (16): 11° C.

The temperature of the powder in the fluid bed in the drying chamber was kept at 62° C., while the temperature of the gas withdrawn at 17 was 78° C.

The final whey powder recovered at 22 had a moisture content of 1.95% by weight.

The powder had the following characteristics:

| Bulk Density: | |
| --- | --- |
| Tapped 0 x: | 0.53 g/ml |
| Tapped 100 x: | 0.61 g/ml |
| Tapped 1250 x: | 0,63 g/ml |
| Solubility Index: | 0.1 (ADMI) |
| Particle Size Distribution: | >750 micron 1% |
| | 500–770 micron 3% |
| | 315–750 micron 12% |
| | 250–315 micron 24% |
| | 200–250 micron 16% |
| | 177–200 micron 12% |
| | 149–177 micron 15% |
| | 120–149 micron 8% |
| | <120 micron 9% |
| Particle Density: | 1.41 g/ml. |

The product was non-caking (cakeness 0%, NA method A 15a).

We claim:

1. A process for producing an agglomerated powdery milk product, comprising the steps of
   (a) atomizing a liquid derived from milk, in the upper part of a conical downward tapering drying chamber by means of a nozzle into a central downward stream of drying gas at 200°–400° C. to produce particles,
   (b) maintaining in the lower part of said drying chamber a layer of particles fluidized in an upward stream of gas having a velocity of 0.3–1.5 m/sec, whereby the temperature of said upward stream of gas is adjusted between 10° and 150° C. to maintain the temperature required of the fluidized particles for ensuring the agglomeration ability of said particles with respect to the particles produced in step (a), and wherein the amount of particles in the fluidized layer is adjusted corresponding to a pressure drop of 1.5–4.5 k Pas over the fluidized layer,
   (c) adjusting the amount of said liquid to the amount and drying capacity of the downward stream to ensure a moisture content of the particles reaching the fluidized layer between 2–16% and sufficient for agglomerating said particles by forming clusters thereof, but less than the moisture content which would cause formation of monogranules, and also to ensure that the downward gas stream still has a substantial drying capacity upon reaching the fluidized layer and sufficient kinetic energy for penetrating therein, thereby contributing to the drying process in the fluidized layer and promoting removal of particles and small agglomerates from the fluidized layer to the upper part of the drying chamber for agglomerate-forming contact with wet droplets and moist particles,
   (d) withdrawing a stream comprising the gas from said downward stream and the gas from said upward stream at a non-central location in the upper part of the drying chamber,
   (e) adjusting the amount of drying gas introduced as a central downward stream to be 2–4 times the amount of the upward stream of fluidizing gas, and
   (f) recovering agglomerated particles from said fluidized layer.

2. The process of claim 1, wherein the ratio between the kinetic energy of the downward stream of gas and the kinetic energy of the upward stream of gas is in the range of 1000–15000.

3. The process of claim 1, wherein the mean residence time of the particles in the fluidized layer is at least 5 minutes.

4. The process of claim 1, wherein the agglomerated particles recovered in step (f) are further dried outside said drying chamber.

5. The process of claim 1 for producing agglomerated skim milk powder comprising
   (a) atomizing a skim milk concentrate of 45–52% by weight dry solids into a stream of air at 230°–350° C. having a downward velocity of 20–40 m/sec, whereby the amount of said concentrate is adjusted to produce particles of skim milk powder, which upon reaching the surface of said fluidized layer have a moisture content of 10-15%,
(b) maintaining said layer of fluidized particles at a temperature of 60°-80° C. by introducing drying air at 70°-150° C. having an upward velocity of 0.3-1.5 m/sec in the lower part of said layer,
(c) withdrawing from the upper part of the drying chamber a stream of air entraining fine particles of skim milk powder,
(d) collecting said fine entrained particles,
(e) recycling the collected fine particles to said fluidized layer in the drying chamber,
(f) recovering agglomerated skim milk powder particles having a moisture content of 3.0-9% from the fluidized layer.

6. The process of claim 5, wherein the skim milk powder particles recovered in step (f) are dried outside the drying chamber to a moisture content of 2-5%.

7. The process of claim 1 for producing agglomerated whole milk powder comprising
(a) atomizing a whole milk concentrate of 45-52% by weight dry solids into a stream of air at 200°-300° C. having a downward velocity of 20-40 m/sec, whereby the amount of said concentrate is adjusted to produce particles of whole milk powder, which upon reaching the surface of said fluidized layer have a moisture content of 8-16%,
(b) maintaining said layer of fluidized particles at a temperature of 60°-80° C. by introducing drying air at 70°-150° C. having an upward velocity of 0.3-1.5 m/sec in the lower part of said layer,
(c) withdrawing from the upper part of the drying chamber a stream of air entraining fine particles of whole milk powder,
(d) collecting said fine entrained particles,
(e) recycling the collected fine particles to said fluidized layer in the drying chamber,
(f) recovering agglomerated whole milk powder particles having a moisture content of 4.5-9% from the fluidized layer.

8. The process of claim 7, wherein the particles recovered in step (f) are further dried and cooled outside the drying chamber to a moisture content of 2-4%.

9. The process of claim 1 for producing agglomerated whey powder comprising
(a) atomizing a whey concentrate of 48-58% by weight dry solids into a stream of air at 230°-350° C. having a downward velocity of 20-40 m/sec, whereby the amount of said concentrate is adjusted to produce particles of whey powder, which upon reaching the surface of said fluidized layer have a moisture content of 2-6%,
(b) maintaining said layer of fluidized particles at a temperature of 70°-90° C. by introducing drying air at 10°-80° C. having an upward velocity of 0.3-1.5 m/sec in the lower part of said layer,
(c) withdrawing from the upper part of the drying chamber a stream of air entraining fine particles of whey powder,
(d) collecting said fine entrained particles,
(e) recycling the collected fine particles to said fluidized layer in the drying chamber,
(f) recovering agglomerated whey powder particles from the fluidized layer, which particles have an average particle size of 200-700$\mu$ and a moisture content of 1-5%.

10. The process of claim 1, wherein the upward stream of gas in the lower part of said drying chamber has a velocity of 0.6-1.5 m/sec.

11. The process of claim 4, wherein the agglomerated particles are cooled outside said drying chamber.

12. The process of claim 4, in which the agglomerated particles from step (f) are further dried and cooled outside said drying chamber in a vibrated fuidized bed.

13. The process of claim 6, wherein the skim milk powder particles recovered in step (f) are dried outside the drying chamber in a vibrated fluidized bed.

14. The process of claim 8, wherein the particles recovered in step (f) are dried and cooled outside the drying chamber in a vibrated fluidized bed.

15. The process of claim 9, wherein the whey concentrate is precrystallized.

* * * * *